(12) United States Patent
Lee et al.

(10) Patent No.: US 9,233,441 B2
(45) Date of Patent: Jan. 12, 2016

(54) MACHINING SYSTEM

(71) Applicant: HON HAI PRECISION INDUSTRY CO., LTD., New Taipei (TW)

(72) Inventors: Teh-Yuh Lee, New Taipei (TW); Ching Chang, New Taipei (TW); Wei-Jung Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 208 days.

(21) Appl. No.: 13/922,838

(22) Filed: Jun. 20, 2013

(65) Prior Publication Data

US 2014/0013591 A1    Jan. 16, 2014

(30) Foreign Application Priority Data

Jul. 11, 2012   (TW) .............................. 101124849 A

(51) Int. Cl.

| | |
|---|---|
| *B23Q 37/00* | (2006.01) |
| *B23Q 41/02* | (2006.01) |
| *B23Q 7/03* | (2006.01) |
| *B23Q 7/14* | (2006.01) |
| *B23P 23/00* | (2006.01) |
| *B23P 21/00* | (2006.01) |

(52) U.S. Cl.
CPC ............... *B23P 23/00* (2013.01); *B23P 21/004* (2013.01); *B23Q 7/1405* (2013.01); *B23Q 37/005* (2013.01); *B23Q 37/007* (2013.01); *B23Q 41/02* (2013.01); *B23Q 7/03* (2013.01); *Y10T 29/50* (2015.01); *Y10T 29/52* (2015.01)

(58) Field of Classification Search
CPC .. Y10T 29/50; Y10T 29/5124; B23Q 37/007; B23Q 37/005

USPC .................................................... 29/560, 563
See application file for complete search history.

(56) References Cited

U.S. PATENT DOCUMENTS

| | | | | |
|---|---|---|---|---|
| 7,555,823 | B2 * | 7/2009 | Arai ................................ | 29/560 |
| 2009/0151148 | A1 * | 6/2009 | Reinisch et al. ................ | 29/563 |

FOREIGN PATENT DOCUMENTS

| | | | |
|---|---|---|---|
| DE | 3625787 | A1   | 2/1988 |
| DE | 19741671 | A1 * | 7/1998 |

OTHER PUBLICATIONS

Machine Translation of DE 19741671, which DE '671 was published Jul. 1998.*

(Continued)

*Primary Examiner* — Erica E Cadugan
(74) *Attorney, Agent, or Firm* — Novak Druce Connolly Bove + Quigg LLP

(57) ABSTRACT

A machining system includes two machining devices. Each machining device includes a bracket and a machining unit, a transferring unit, a control unit mounted on the bracket. The transferring unit includes a driving member and a transferring member connected to the driving member. The control unit is electrically connected to the machining unit and the driving member. The two machining devices are arranged in a straight line. The transferring members are connected in order. The control unit of one machining device controls the machining unit to machine the workpiece, and when the machining unit has finished machining the workpiece, the control unit controls the driving member to drive the transferring member, thus the transferring member of one machining device conveys the workpiece to the transferring member of an adjacent machining device.

16 Claims, 3 Drawing Sheets

(56) References Cited

OTHER PUBLICATIONS

Machine Translation of DE 3625787, which DE '787 was published Feb. 1988.*

* cited by examiner

MACHINING SYSTEM

BACKGROUND

1. Technical Field

The present disclosure relates to machining systems, particularly to a machining system capable of automatically transferring workpieces.

2. Description of Related Art

Workpieces may be machined automatically by many different machining devices, for improving a machining efficiency. However, due to the transporting of the workpieces between two automatically machined processes, the workpieces may be still conveyed manually or semi-automatically (such as using a vehicle, for example), which results in wasted time. In addition, during the conveying of workpieces manually or semi-automatically, the workpieces may easily be scratched or damaged.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
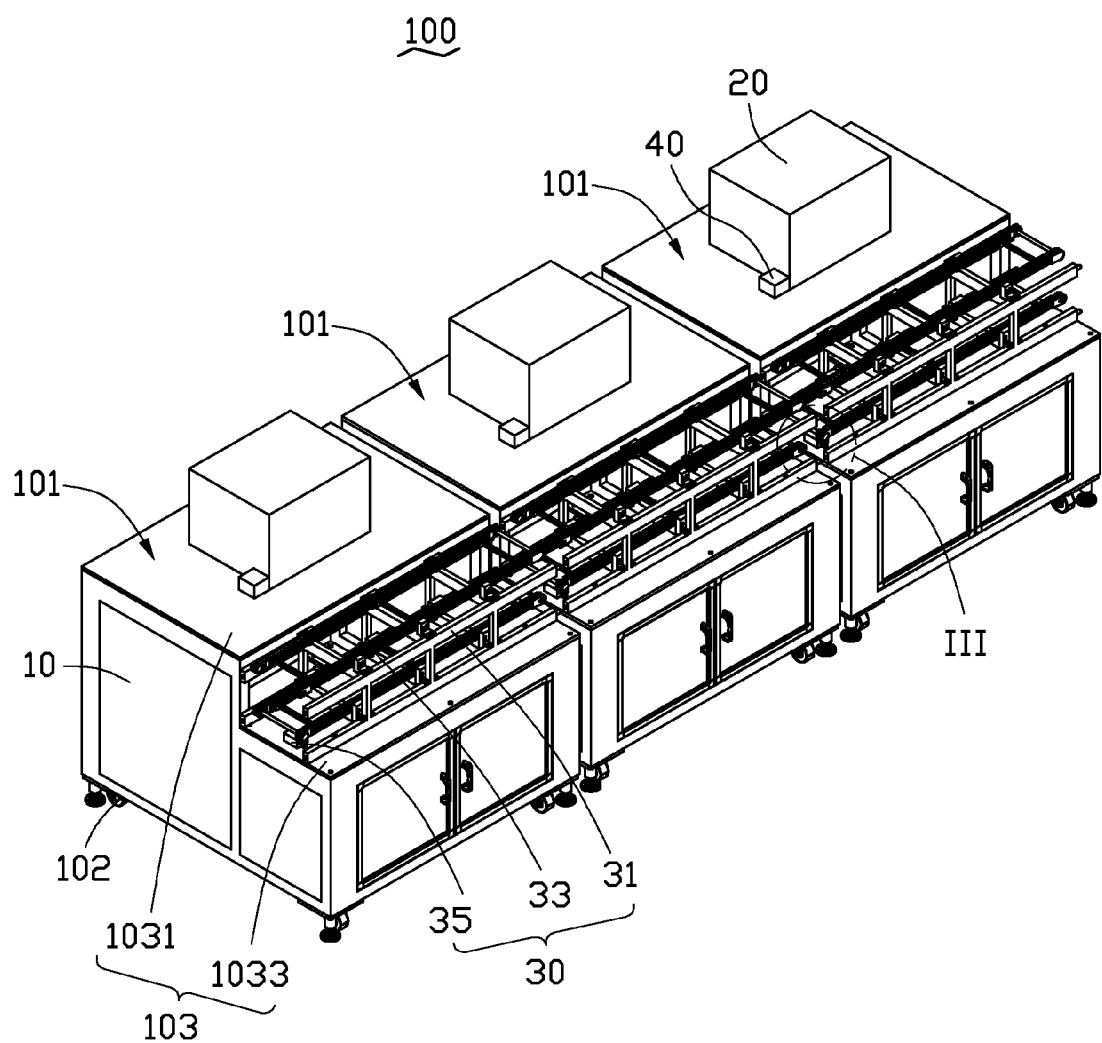
FIG. 1 is an isometric view of an embodiment of machining system including a plurality of machining device.

FIG. 1 shows a machining system 100 of an embodiment. The machining system 100 includes at least two machining devices 101, for machining workpieces (not shown) in different processes. In the illustrated embodiment, there are three machining devices 101.

Each machining device 101 includes a bracket 10, a machining unit 20 (shown in a simplified configuration), a transferring unit 30, and a control unit 40 (shown in a simplified configuration). The machining unit 20 and the transferring unit 30 are mounted on the bracket 10. The control unit 40 is mounted on the machining unit 20, and is electronically connected with the machining unit 20 and the transferring unit 30. The control unit 40 controls the machining unit 20 to machine the workpieces and controls the transferring unit 30 to transfer the workpieces. In the illustrated embodiment, three machining units 20 of the three machining devices 101 are connected one by one in order. In an alternative embodiment, the control unit 40 may be mounted on the bracket 10 or the transferring unit 30. In the illustrated embodiment, the three machining devices 101 are arranged along a straight line. Due to the differences that exist between the three machining devices 101 are relating to performing of different functions of the machining units 20 for achieving different results for various processes to the workpieces, thus only one of the machining devices 101 is detailed in following descriptions.

The bracket 10 is substantially a rectangular box. A plurality of rollers 102 are mounted on corners of a bottom surface of the bracket 10, for conveniently moving the machining device 101 to other places. The bracket 10 includes a supporting surface 103 on a top thereof. In the embodiment, the supporting surface 103 is a stepped surface, and includes a first mounting surface 1031 and a second mounting surface 1033 parallel to the first mounting surface 1031, respectively. The first mounting surface 1031 is higher than the second mounting surface 1033 relative to the rollers 102.

Figure 2:
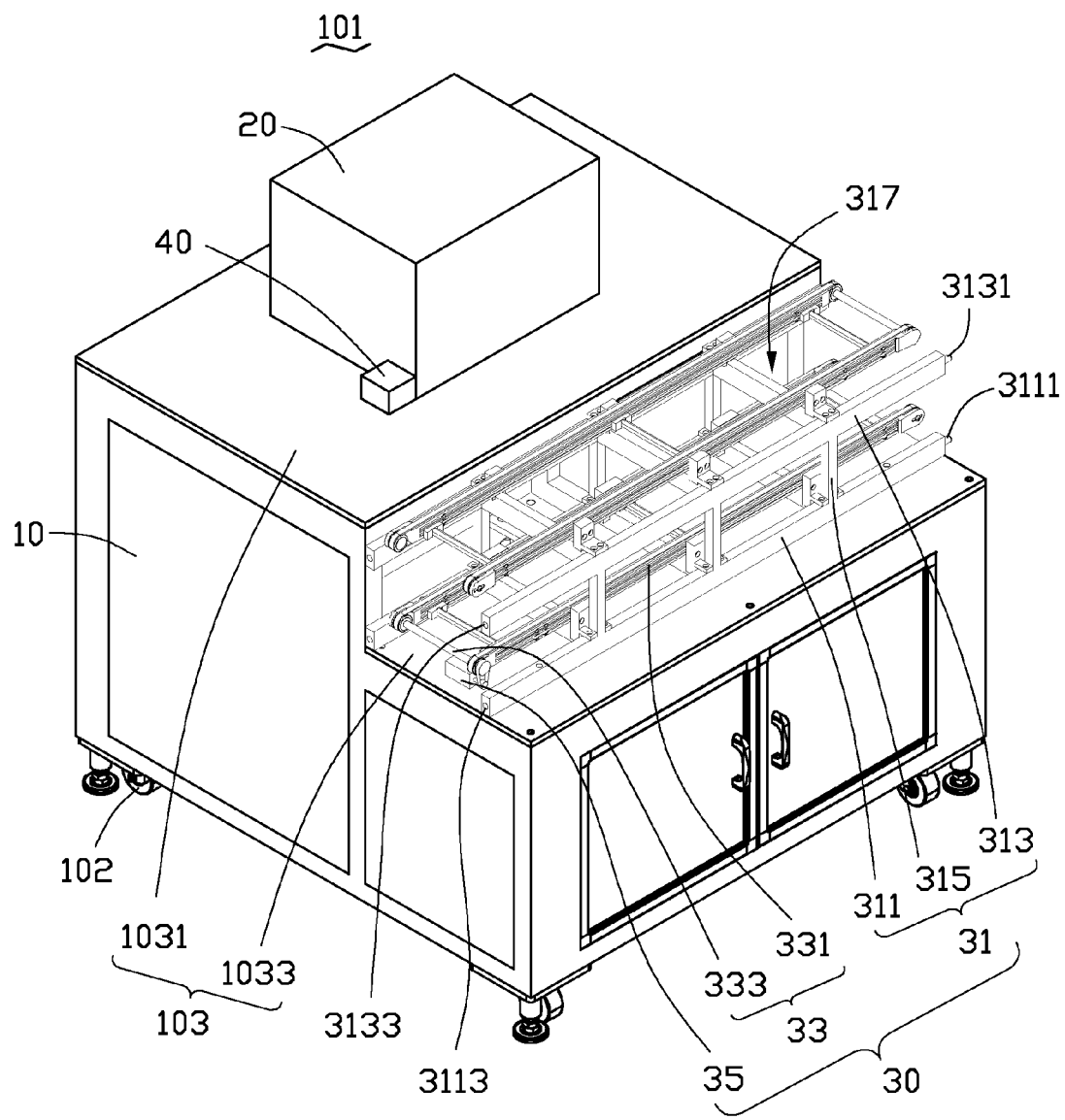
FIG. 2 is an enlarged, isometric view of one machining device shown in FIG. 1.

FIG. 2 shows that the machining unit 20 is mounted on the first mounting surface 1031. The transferring unit 30 is mounted on the second mounting surface 1033. The machining unit 20 machines workpieces positioned on the transferring unit 30. The transferring unit 30 includes a fixing member 31, at least one transferring member 33, and at least one driving member 35. The fixing member 31 is mounted on the second mounting surface 1033. The at least one transferring member 33 is mounted on the fixing member 31. The at least one driving member 35 is mounted on the second mounting surface 1033, and is connected to an end of the at least one transferring member 33. The driving member 35 drives the transferring member 33 to move towards an adjacent machining device 101, thereby transferring the workpieces positioned on the transferring member 33 to the adjacent machining device 101. In the embodiment, there are two transferring members 33 and two driving members 35 for each transferring unit 30 (only one driving member 35 is shown for the sake of brevity). The two transferring members 33 are mounted on the fixing member 31 parallel to each other. Each driving member 35 is mounted on one corresponding transferring member 33, and drives the corresponding transferring member 33 to move. The fixing members 31 of adjacent machining devices 101 are connected together, thus enable workpieces on the at least one transferring member 33 to be transferred to the at least one transferring member 33 of the adjacent machining device 101. In an illustrated embodiment, the transferring members 33 of the three machining devices 101 are arranged on a straight line, and the transferring members 33 are connected one by one in order.

Figure 3:
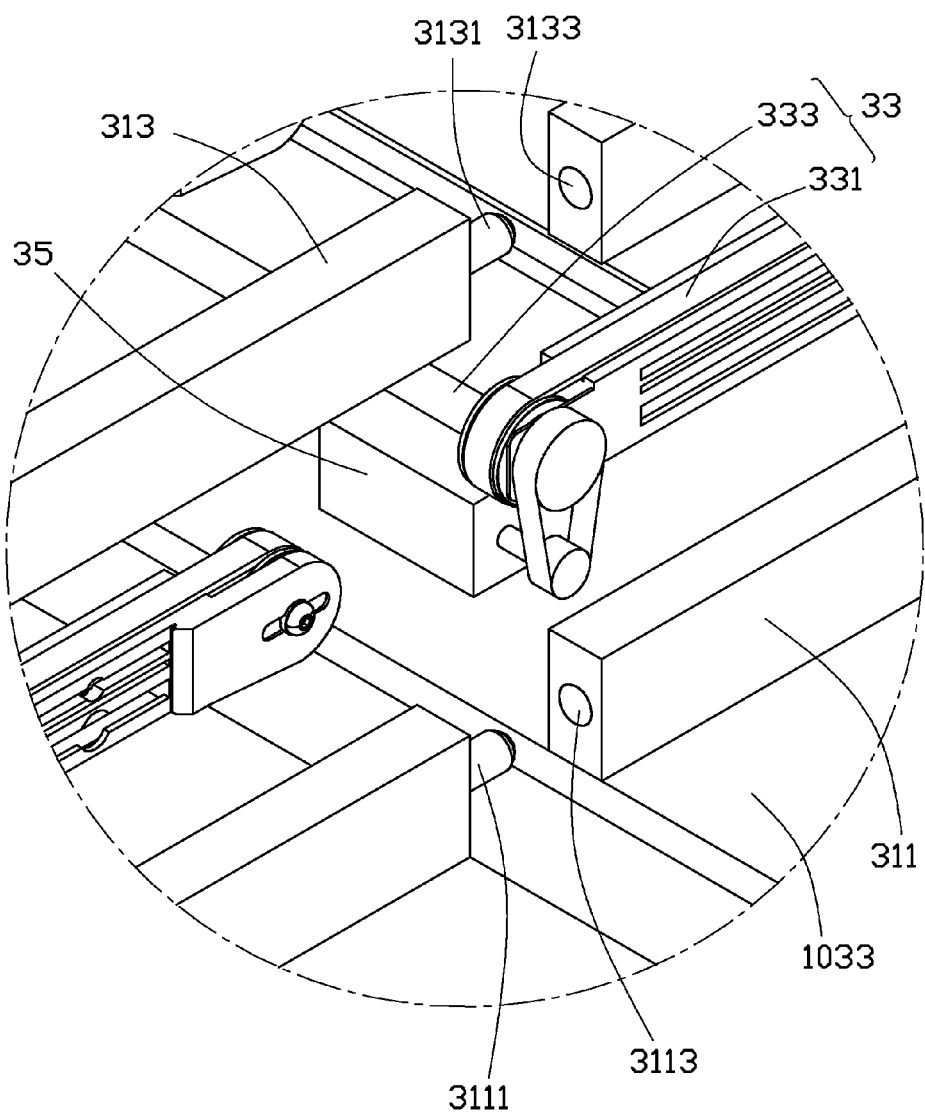
FIG. 3 is an enlarged, isometric view of a circled portion III in FIG. 1.

FIGS. 2 and 3 show the fixing member 31 which includes a first supporting portion 311, a second supporting portion 313, and a plurality of connecting portions 315 connecting the first supporting portion 311 and the second supporting portion 313. The first supporting portion 311 is mounted on the second mounting surface 1033, parallel to the second supporting portion 313. The first supporting portion 311 is substantially ladder-like, and is positioned along a direction parallel to an imaginary straight line where the three machining devices 101 are arranged. The first supporting portion 311 includes a connecting end 3111 and an engaging end 3113 at opposite ends thereof.

The connecting end 3111 of one machining device 101 is configured to connect with the engaging end 3113 of an another machining device 101 adjacent to the connecting end 3111 of the one machining device 101. The engaging end 3113 of the one machining device 101 is configured to connect with the connecting end 3111 of an another machining device 101 adjacent to the engaging end 3113 of the one machining device 101. Therefore, the machining devices 101 being serially connected are positioned together.

A structure and a shape of the second supporting portion 313 are substantially same as those of the first supporting portion 311. The second supporting portion 313 is located above the first supporting portion 311 and is parallel to the first supporting portion 311. The first supporting portion 311 and the second supporting portion 313 are configured to support one corresponding transferring member 33. The second supporting portion 313 also includes a connecting end 3131 and an engaging end 3133 at opposite ends thereof. Each connecting portion 315 is substantially a rod, and two distal ends of the connecting portion 315 perpendicularly connect with the first supporting portion 311 and the second supporting portion 313, respectively. In the embodiment, the plurality of connecting portions 315 is arranged being spaced apart in two rows. The first supporting portion 311, the second supporting portion 313 and the connecting portion 315 define a transferring passage 317, cooperatively. In an illustrated embodiment, the connecting ends 3111, 3131 are posts, and the engaging ends 3113, 3133 are holes. In the alternative embodiment, the connecting portions 315 may be inclined relative to the first supporting portion 311 and the second supporting portion 313. The connecting end 3111, 3131 and the engaging end 3113, 3113 may be designed or configured on the first supporting portion 311 or the second supporting portion 313. The connecting ends 3111, 3131 and the engaging ends 3113, 3133 may be connected in other ways, such as magnetically connected together.

The two transferring members 33 are supported by the first supporting portion 311 and the second supporting portion 313, respectively, and are parallel to each other. One of the two transferring members 33 is supported by the first supporting portion 311 conveys workpieces in the transferring passage 317 thereof. The transferring members 33 are arranged in a direction parallel to the first supporting portion 311 and the second supporting portion 313. Each transferring member 33 includes two conveyors 331 and a driving shaft 333 positioned at an end of the two conveyors 331. The conveyors 331 are parallel to each other. Two ends of the driving shaft 333 connect with the conveyors 331, respectively. In the illustrated embodiment, the transferring members 33 are belt conveyors.

Two driving members 35 are positioned on the second mounting surface 1033. Each driving member 35 is located near one corresponding driving shaft 333. Each driving member 35 is connected to the corresponding driving shaft 333, for driving the driving shaft 333 to rotate, thus enabling the driving shaft 333 to drive the conveyor 331 to move. In the illustrated embodiment, the driving member 35 is a motor. In an alternative embodiment, the driving member 35 may be a rotary cylinder. The transferring member 33 may be mounted on the second mounting surface 1033, and thus the fixing member 31 may be omitted. A number of the conveyor 331 may be one, three, or more than three, and a width of the conveyor 331 may be changed according to a size of the workpieces.

The control unit 40 is electrically connected to the driving member 35. The control unit 40 is configured to detect a workpiece conveyed from the machining device 101 performing a previous process, and then emits a control signal to the machining unit 20 to control the machining unit 20 to machine the workpiece. The control unit 40 is also configured to detect a workpiece after being machined by the machining unit 20, and emits a control signal to the driving member 35 to control the driving member 35 to drive the transferring member 33, thus the machined workpiece is conveyed to the adjacent machining device 101, for performing a subsequent machining process.

In assembly, first, the machining devices 101 are assembled one by one respectively. The machining unit 20 is mounted on the first mounting surface 1031, and the fixing member 31 is mounted on the second mounting surface 1033. The transferring members 33 are mounted on the first supporting portion 311 and the second supporting portion 313, respectively. The driving members 35 are connected to the driving shafts 333 of the transferring members 33, respectively. Then, the connecting end 3131, 3111 is engaged with the corresponding engaging end 3133, 3113, thus the machining devices 101 are connected together and arranged in a straight line.

In use, the machining unit 20 of the machining device 101 located at a beginning end of a series of connected machining devices 101 machines the workpiece positioned on the transferring member 33. When the machining of the workpieces is finished, the control unit 40 emits a control signal to the driving member 35. The driving member 35 drives the transferring member 33 to move towards an adjacent machining device 101 according to the control signal, and thus the workpiece is conveyed to the transferring member 33. The control unit 40 of the machining device 101 located in the middle among the series of connected machining devices 101 (referred to as "located in the middle") detects the conveyed workpiece, and emits a signal to the machining unit 20 of the adjacent machining device 101. The machining unit 20 machines the workpiece according to the control signal. When the machining of the workpieces is completed, the control unit 40 of the machining device 101 located in the middle controls the driving member 35 to drive the transferring member 33 of the machining device 101 located in the middle to move, and thus the workpiece is conveyed to the machining device 101 located at a finish end of the series of connected machining devices 101 for machining.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A machining system, comprising at least two machining devices, the at least two machining devices comprising a first machining device and a second machining device, configured for machining workpieces each of the first machining device and the second machining device comprising:
   a bracket;
   a plurality of rollers mounted on the bracket, wherein the bracket comprises a support surface on a top side thereof away from the plurality of rollers, the supporting surface is a stepped surface, and comprises a first mounting surface and a second mounting surface parallel to the first mounting surface, the first mounting surface is higher than the second mounting surface relative to the plurality of rollers;
   a machining unit mounted on the first mounting surface of the bracket;
   a transferring unit mounted on the second mounting surface of the bracket, and comprising a driving member and a transferring member, the transferring member connected to the driving member, the transferring member configured to support and convey the workpieces; and
   a control unit mounted on the first mounting surface of the bracket;
   wherein the first machining device and the second machining device are arranged side by side, the transferring member of the first machining device and the transferring member of the second machining device are connected one by one, the control unit of the first machining device controls the machining unit of the first machining device to machine a workpiece positioned on the transferring member of the first machining device, and when the machining unit of the first machining device is finished machining the workpiece, the control unit of the first machining device controls the driving member of the first machining device to drive the transferring member of the first machining device to convey the workpiece to the transferring member of the second machining device.

2. The machining system of claim 1, wherein each transferring unit further comprises a fixing member fixed to the corresponding bracket, each transferring member is mounted on the corresponding fixing member.

3. The machining system of claim 2, wherein each fixing member comprises a connecting end and an engaging end at opposite ends thereof, the connecting end of the fixing member of the first machining device is engaged with the engaging end of the fixing member of the second machining device.

4. The machining system of claim 3, wherein each connecting end comprises a post, each engaging end defines a hole corresponding to the corresponding connecting end.

5. The machining system of claim 3, wherein each fixing member comprises:
   a first supporting portion positioned on the bracket, wherein the connecting end and the engaging end are positioned at opposite ends of the first supporting portion,
   a second supporting portion, and
   a connecting portion connecting the first supporting portion to the second supporting portion.

6. The machining system of claim 5, wherein each transferring unit further comprises an another transferring member, the transferring members are supported by the first supporting portion and the second supporting portion, respectively.

7. The machining system of claim 6, wherein each first supporting portion, the corresponding second supporting portion, and the corresponding connecting portion define a transferring passage cooperatively, each transferring member supported by the corresponding first supporting portion conveys workpieces along the corresponding transferring passage.

8. The machining system of claim 2, wherein each transferring member comprise a conveyor positioned on the corresponding fixing member and a driving shaft positioned at an end of the conveyor, each driving member is connected with the driving shaft of the corresponding transferring member, each driving member rotates the corresponding driving shaft to move the corresponding conveyor.

9. A machining system, comprising at least two machining devices, the at least two machining device comprising a first machining device and a second machining device, configured for machining workpieces, each of the first machining device and the second machining device comprising:
   a bracket;
   a plurality of rollers mounted on the bracket, wherein the bracket comprises a supporting surface on a top side thereof away from the plurality of rollers, the supporting surface is a stepped surface, and comprises a first mounting surface and a second mounting surface parallel to the first mounting surface, the first mounting surface is higher than the second mounting surface relative to the plurality of rollers;
   a machining unit mounted on the first mounting surface of the bracket;
   a transferring unit mounted on the second mounting surface of the bracket, and comprising at least one driving member and at least one transferring member connected to the at least one driving member, the at least one transferring member configured to support and convey the workpieces; and
   a control unit mounted on the first mounting surface of the bracket, and electrically connected to the machining unit and the at least one driving member;
   wherein the transferring members of the first machining device and the second machining device are connected one by one, the control unit of the first machining device controls the corresponding machining unit to machine a workpiece positioned on the at least one transferring member of the first machining device, and when the machining unit of the first machining device is finished machining the workpiece, the control unit of the first machining device controls the at least one driving member of the first machining device to drive the at least one transferring member of the first machining device to convey the workpiece to the at least one transferring member of the second machining device.

10. The machining system of claim 9, wherein each transferring unit further comprises a fixing member fixed to the corresponding bracket, each of the at least one transferring member is mounted on the corresponding fixing member.

11. The machining system of claim 10, wherein each fixing member comprises a connecting end and an engaging end at opposite ends thereof, the connecting end of the fixing member of the first machining device is engaged with the engaging end of the fixing member of the second machining device.

12. The machining system of claim 11, wherein each connecting end comprises a post, each engaging end defines a hole corresponding to the corresponding connecting end.

13. The machining system of claim 11, wherein each fixing member comprises:
   a first supporting portion positioned on the bracket, wherein the connecting end and the engaging end are positioned at opposite ends of the first supporting portion,
   a second supporting portion, and
   a connecting portion connecting the first supporting portion to the second supporting portion.

14. The machining system of claim 13, wherein a number of each of the at least one transferring member is two, the two transferring members are supported by the first supporting portion and the second supporting portion, respectively.

15. The machining system of claim 14, wherein each first supporting portion, the corresponding second supporting portion, and the corresponding connecting portion define a transferring passage cooperatively, each transferring member supported by the corresponding first supporting portion conveys workpieces along the transferring passage.

16. The machining system of claim 10, wherein each of the at least one transferring member comprises two conveyors positioned on the corresponding fixing member and a driving shaft positioned at an end of the conveyors, each of the at least one driving member is connected with the driving shaft of the corresponding at least one transferring member, each of the at least one driving member rotates the corresponding driving shaft to move the corresponding conveyors.

* * * * *